United States Patent [19]
Vagias

[11] 3,893,497
[45] July 8, 1975

[54] ANTI-SKID DEVICE FOR AUTOMOBILE TIRES AND THE LIKE

[76] Inventor: Ernest Vagias, 265 Prospect St., Baden, Pa. 15005

[22] Filed: Nov. 20, 1973

[21] Appl. No.: 417,502

[52] U.S. Cl. .............................. 152/179; 152/210
[51] Int. Cl. ............................................ B60c 11/00
[58] Field of Search ........... 152/179, 190, 191, 185, 152/186, 187, 213 A, 210

[56] References Cited
UNITED STATES PATENTS

| 560,408 | 5/1896 | Hazeltine | 152/187 |
| 1,263,295 | 4/1918 | Urch | 152/190 |
| 1,441,262 | 1/1923 | Bardo et al. | 152/187 |
| 2,046,159 | 6/1936 | Gottlieb | 152/191 |
| 2,311,621 | 2/1943 | Royer | 152/213 A |
| 2,535,299 | 12/1950 | Leach et al. | 152/186 |

*Primary Examiner*—Allen N. Knowles
*Assistant Examiner*—Hadd Lane
*Attorney, Agent, or Firm*—Brown, Murray, Flick & Peckham

[57] ABSTRACT

An anti-skid apparatus made from a tire casing or the like by completely removing a radial segment approximately equal to the radial contact distance that a pneumatic tire of a vehicle makes with the road surface. A substantial area of one side wall is cut from the remaining portion of the tire casing and it is severed to form two casing parts that are hinged together. The revamped tire casing can be freely passed over and partially surround the tread portion of the pneumatic tire while in contact with the ground. Two forms of fastening means are disclosed for interconnecting the free ends of the tire casing to hold it upon the pneumatic tire.

7 Claims, 5 Drawing Figures

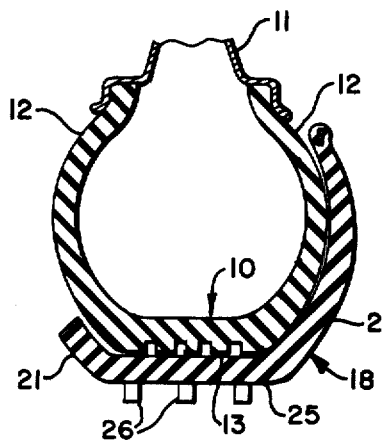
Fig. 2
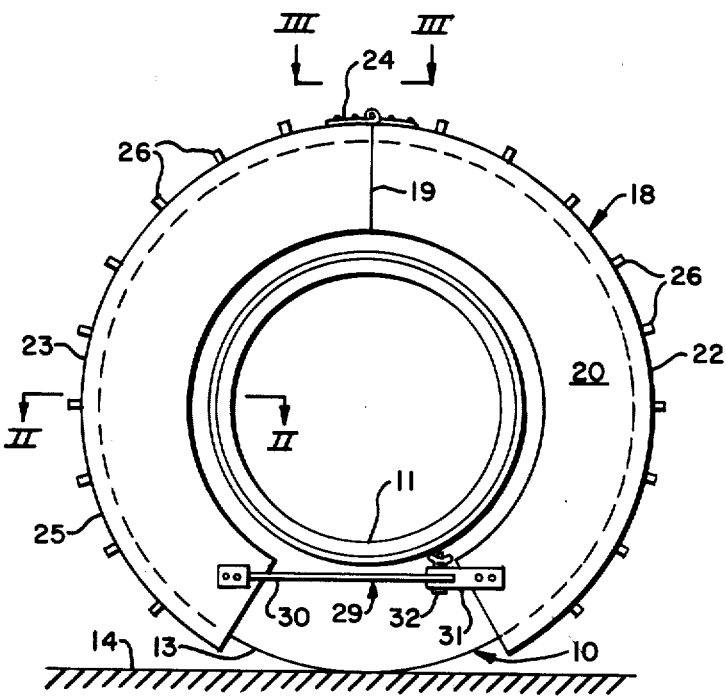
Fig. 3
Fig. 1
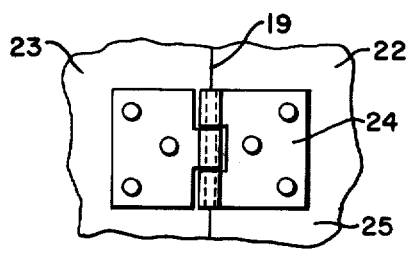
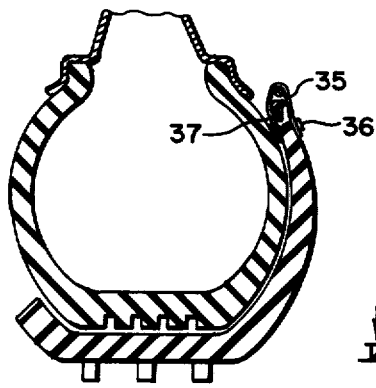
Fig. 5
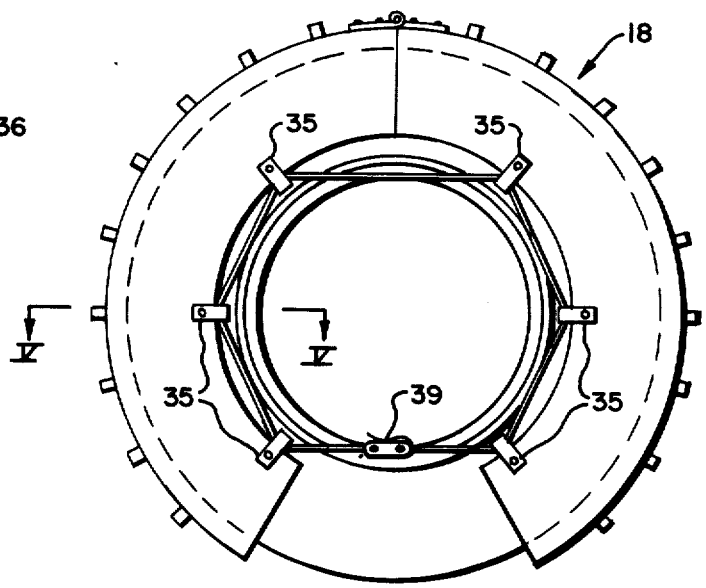
Fig. 4

ANTI-SKID DEVICE FOR AUTOMOBILE TIRES AND THE LIKE

BACKGROUND OF THE INVENTION

The present invention relates to anti-skid or tractionaid apparatus particularly for use with pneumatic tires of an automobile or the like. The present invention is particularly related to a traction-aid apparatus designed for rapid and convenient installation upon a pneumatic tire while it supports an automobile.

One common type of traction-aid device comprises metallic chains adapted to envelop the tread and a portion of the side walls of an inflated tire. This type of device is put into use by elevating vehicle so that the pneumatic tires for the drive wheels are out of contact with the road surface. After this is accomplished, it is usually a cumbersome and awkward procedure by which the metallic chains are positioned into their desired enveloping relation upon the tire. A fastener is used to inter-connect the free ends of the chain at the side walls. This procedure must then be repeated with the other driven pneumatic tire of the vehicle.

The crosslinks of the chains create considerable noise during their use and tend to wear rapidly when driving over dry sections of the road. Chains are expensive to manufacture and have a comparatively short life. This represents a considerable expense to the motorist who must necessarily resort to some form of anti-skid device as a temporary, short-term measure. Frequently, all that is needed is something that will suffice as a traction-aid device for very short distances and are not ordinarily used by the motorist as a matter of course during a season of inclement weather in a given area. Other forms of prior art anti-skid devices are known wherein old tire casings representing refuse tires are revamped in some manner for use as a traction-aid device. These devices are not adequate because thay still require raising the pneumatic tires of a vehicle above and out of contact with the roadway before the anti-skid devices can be installed onto the pneumatic tire.

SUMMARY OF THE INVENTION

It is an object of the present invention to provide an anti-skid apparatus consisting of a revamped tire casing to envelope the exposed tread portion of the pneumatic tire of a vehicle.

It is a further object of the present invention to provide an anti-skid apparatus for installation upon and removable from a pneumatic tire of a vehicle without the necessity of raising the pneumatic tire out of contact with the support surface of the roadway.

Another object of the present invention is to provide an anti-skid apparatus particularly adapted for short-term use by motorist during emergency situations and conditions.

In one form of the present invention, there is provided an anti-skid apparatus adapted to partially surround the tread portion of a pneumatic tire while supporting a vehicle upon the ground, the apparatus comprising, an anti-skid casing including a tread wall and two spaced apart side walls extending from the tread wall, the casing defining the major portion of a circular segment and being severed at its two side walls to form two casing parts, hinge means for interconnecting the casing parts for pivotal displacement thereof to pass over and partially envelope the tread portion of a pneumatic tire without elevating it out of contact with the ground surface, and interconnecting fastening means carried by the casing parts to span the distance between the terminal ends of the casing for securing the anti-skid casing upon the pneumatic tire. The aforesaid casing parts may be constructed out of a tire casing and a substantial portion of one of its side walls removed to produce a retaining flange to hold the casing in an enveloping relation upon the pneumatic tire.

These features and advantages of the present invention as well as others will be more apparent when the following description is read in light of the accompanying drawings, in which:

FIG. 1 is an elevational view of a revamped refuse tire incorporating the features of the present invention;

FIG. 2 is a sectional view taken along line II—II of FIG. 1;

FIG. 3 is a partial plan view taken along line III-III of FIG. 1;

FIG. 4 is an elevational view similar to FIG. 1 but illustrating a second embodiment of the present invention; and FIG. 5 is a sectional view taken along line V—V of FIG. 4.

FIGS. 1 and 2 illustrates a pneumatic tire 10 mounted upon a rim 11 of a wheeled vehicle in the usual manner. The pneumatic tire as well known includes side walls 12 and a peripheral tread 13 which is shown in supporting contact with a roadway 14. An arcuate segment of contact exists between the tread 13 of the tire and the roadway. The exposed portion of the tread 13 forms the major portion of a segment of a circle.

The anti-skid apparatus, according to the present invention, provides for the use of a tire casing member to envelope the exposed portion of the tread 13. Numerous different forms and types of material may be used to construct the casing member such as for example woven plastic, metal sheets and woven rubber strips. It is preferred, for economical reasons, to revamp a refuse tire casing. The casing is revamped by cutting and discarding a radial segment from the casing which is approximately equal to the radial contact distance between the pneumatic tire and the ground. In this manner, the anti-skid apparatus may be easily positioned to envelope the exposed treaded portion of the pneumatic tire without the necessity of elevating the tire above the ground support surface eg. the roadway. In FIG. 1 there is illustrated a refuse tire casing 18 from which a radial segment has been removed and produces two terminal ends of the casing. The remaining portion of the casing defines the major portion of a circular segment. The casing is severed at 19 through is opposite side walls 20 and 21 to define two casing parts 22 and 23. As shown in FIG. 2, the side wall 21 is actually only a small portion of a usual tire side wall. In this regard a substantial portion of the side wall has been cut away leaving a flange sufficiently large to retain and hold the anti-skid apparatus upon the pneumatic tire.

The casing parts 22 and 23 are connected together by a hinge 24, best shown in FIG. 3. Other forms of hinging devices may be used or the cord material embeded in the tread wall 25 of the casing may serve as a hinge. The hinge 24 is attached the casing parts 22 and 23 within a hollowed out area in the tread wall 25 so that the hinge will be below the tread surface. By hinging the casing parts together they can be pivotally moved to an expanded position to freely pass an expanded position to freely pass over the pneumatic tire 10 and envelope the tread 13 in the manner illustrated in FIG. 2. It is understood, of course, that the refuse tire casing which is revamped for use as the anti-skid apparatus according to the present invention will be approximately equal to or greater than the dimentions of the pneumatic tire 10 so that after revamping the casing will tightly fit along the side walls of the tire and envelope the major portion of the exposed tread 13. This excludes the portion of the tread 13 in contact with the ground during installation of the anti-skid apparatus.

To enhance the anti-skid characteristic of the revamped casing, it is preferred to use conventional metallic studs 26 projecting from the tread wall 25 of the casing at spaced locations about the periphery thereof. In place of studs, short lengths of chains may be fastened by rivets to the side walls of the casing such that lengths of chain overlie the tread surface at spaced intervals. A fastening device is used to tightly hold the revamped casing tightly on the pneumatic tire. The fastening device 29 includes a connecting rod 30 secured at one end to the casing part 23 and a fastening plate 31 secured at one end to the casing part 22. The free ends of the rod 30 and plate 31 are joined together and tightly secured one to the other by a bolt 32.

FIGS. 4 and 5 illustrate a second form of the present invention which differs from that already described in regard to FIGS. 1–3 by the provision of a second form of fastening means for holding a revamped tire casing tightly upon the treaded portion of a pneumatic tire. In place of the fastening device 29 shown in FIG. 1, the second embodiment of the present invention provides a plurality of U-shaped clips 35 attached to the revamped casing 18 at spaced apart locations so as to project from its inside diameter. The clips 35 are attached to the casing by fasteners 36 such as a bolt and nut. The fastener passes through the casing wall directly behind the reinforcing tire beading 37 which remains in the side wall 20. There are six U-shaped clips 35 shown in FIG. 4 and a rope 38 such as braided plastic filment or a wire rope, passes between the opening in the U-shaped clip 35 and the tire casing in a continuous manner. The ends of the rope are located at the terminal ends of the casing where the radial segment has been cut therefrom. The rope at its ends includes a latch 39 for firmly securing the ends of the rope together, thereby firmly holding the anti-skid apparatus in an enveloping relation upon the pneumatic tire.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. An anti-skid apparatus to envelop all but a circular segment just sufficient to permit independent support of a vehicle by the exposed tread of a pneumatic tire thereof upon the ground, said apparatus comprising:

an anti-skid casing including a tread wall and two spaced-apart side walls extending from the edges of said tread wall; said casing excluding a circular segment just sufficient to insure the establishment of an enveloping relation with said pneumatic tire while the tire independently supports the vehicle upon the ground; said casing defining the remaining portion of the circular segment and being divided at its two side walls to form two casing parts and that are hinged together only at the tread wall, at least said tread wall and one of said side walls being discontinuous to define an arcuate gap between terminal ends of the two casing parts just sufficient to independently support said vehicle by the pneumatic tire thereof, the hinged connection at the tread wall joining said casing parts together for pivotal movement only at the tread wall by displacing the terminal ends of the casing parts so as to pass said anti-skid casing into a partially surrounding relation with the tread portion of said pneumatic tire while supporting said vehicle upon the ground, and interconnecting fastening means carried by at least one of the side walls of said casing parts at the free ends thereof to span the distance between the terminal ends thereof for holding said anti-skid casing onto said pneumatic tire.

2. The anti-skid apparatus according to claim 1 wherein said anti-skid casing includes metallic stud members projecting from said tread wall for contact with the ground surface.

3. The anti-skid apparatus according to claim 1 wherein said interconnecting fastening means include a rod member secured to one of said casing parts, a connecting bar secured to the other of said casing parts, and bolt means for securing together the free end of said bar member and said plate member.

4. The anti-skid apparatus according to claim 1 wherein said interconnecting fastening means include a plurality of U-shaped members attached to one of said side walls of said casing at spaced apart locations, rope means connected by said U-shaped members to said casing parts and connecting means on the ends of said rope means for securing the ends together to hold the hinge casing parts onto the treaded portion of said pneumatic tire.

5. The anti-skid apparatus according to claim 1 wherein said anti-skid casing is discontinuous between terminal ends of said tread wall and said two side walls, and one of said side walls defines a retaining flange with said tread wall for holding one side of said casing onto said pneumatic tire.

6. The anti-skid apparatus according to claim 1 wherein one of said side walls forms a retaining flange having a narrow circular wall segment as compared with the other of said side walls.

7. The anti-skid apparatus according to claim 1 further comprising hinge means interconnecting said casing parts for the pivotal displacement of the terminal ends thereof.

* * * * *